United States Patent
Zeng et al.

(10) Patent No.: US 11,599,287 B2
(45) Date of Patent: Mar. 7, 2023

(54) METHOD AND APPARATUS FOR BAD BLOCK MANAGEMENT IN FLASH MEMORY

(71) Applicant: Realtek Semiconductor Corp., HsinChu (TW)

(72) Inventors: Hua Zeng, Zhangsha (CN); Mingrui Li, Zhangsha (CN); Kui Rong, Zhangsha (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/368,811

(22) Filed: Jul. 6, 2021

(65) Prior Publication Data

US 2022/0269409 A1 Aug. 25, 2022

(30) Foreign Application Priority Data

Feb. 19, 2021 (CN) .......................... 202110191743.1

(51) Int. Cl.
*G06F 3/06* (2006.01)

(52) U.S. Cl.
CPC ............ *G06F 3/064* (2013.01); *G06F 3/0602* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 6,360,293 B1* | 3/2002 | Unno | ................... | G11C 29/765 711/103 |
| 8,112,682 B2* | 2/2012 | Lasser | .................... | G11C 29/08 714/733 |
| 9,442,833 B1* | 9/2016 | Johansson | .............. | G11C 16/20 |
| 11,049,585 B1* | 6/2021 | Hung | .................... | G11C 11/409 |
| 2004/0080998 A1* | 4/2004 | Chang | .................... | G11C 29/26 365/200 |
| 2006/0077872 A1* | 4/2006 | Hwang | .............. | G11B 20/1883 369/53.2 |
| 2011/0161727 A1* | 6/2011 | Lee | ..................... | G06F 11/1662 714/6.12 |
| 2011/0238900 A1* | 9/2011 | Heo | ....................... | G06F 9/4403 711/E12.008 |
| 2012/0005451 A1* | 1/2012 | Lee | ..................... | G06F 12/0246 711/E12.068 |
| 2012/0096321 A1* | 4/2012 | Yeh | ..................... | G06F 12/0246 714/710 |

(Continued)

*Primary Examiner* — Yaima Rigol
(74) *Attorney, Agent, or Firm* — Winston Hsu (57) ABSTRACT

A method of managing blocks in a flash memory includes: detecting states of blocks of a reserved area in the flash memory and building a bad block management table accordingly; recording mappings between bad blocks of an user area in the flash memory and good blocks of the reserved area into the bad block management table; when the bad block management table indicates there is no good block remaining in the reserved area that can be mapped to, selecting one of bad blocks of the reserved area or the user area and obtaining a recollected block after erasing the selected bad block; recording a mapping between the recollected block and a bad block in the user area into the bad block management table; and based on the bad block management table, programming data into the recollected block.

4 Claims, 6 Drawing Sheets

(56) References Cited

U.S. PATENT DOCUMENTS

2015/0187442 A1* 7/2015 Sivasankaran ......... G11C 29/82
                                                          365/185.09
2017/0090762 A1* 3/2017 Ea ....................... G11C 11/5621

* cited by examiner

METHOD AND APPARATUS FOR BAD BLOCK MANAGEMENT IN FLASH MEMORY

BACKGROUND OF THE INVENTION

1. Field of the Invention

The present invention relates to flash memory, and more particularly to a method and apparatus for bad block management in flash memory.

2. Description of the Prior Art

Storage units in a flash memory are divided into a plurality of blocks of same sizes, and the storage unit may become abnormal or unusable due to manufacturing defects, interference to erase or write operation (i.e., program-disturb errors), interference to read operation (i.e., read-disturb errors), or accidental factors such as voltage instability/ abnormal power failure. Once a block contains one or more abnormal storage units, such block is deemed as a bad block. Generally, the storage units in the flash memory can be divided into two areas, one of which is a user area and the other is a reserved area. Both of the two areas contain a certain number of blocks. User data to be written requested by a host will be stored into blocks of the user area. If a block of the user area becomes a bad block, blocks of the reserved area will be used to replace it. However, if the amount of blocks of the reserved area is not sufficient for replacing the bad blocks of the user area, the flash memory will completely wear out. On the other hand, the flash memory also records mappings between the bad blocks and replacement blocks through lookup tables. Once the block storing these lookup tables fails, the above replacement mechanism will be no longer reliable.

SUMMARY OF THE INVENTION

With this in mind, it is one object of the present invention to provide a bad block management mechanism for the flash memory. In the bad block management mechanism of the present invention, once there are no good blocks remaining in the reserved area, the present invention attempts to recollect bad blocks of the user area or the reserved area. If states of the bad block turn out to normal after erasing, the previously bad state is regarded as pseudo-bad. The pseudo-bad blocks will be recollected and reused later. On the other hand, the present invention also provides a method for storing bad block management tables. In this method, a certain range of blocks are used to store and backup the bad block management tables, thereby improving the storage security and efficiency of the bad block management table. In view of above, the present invention can provide safer and more efficient management bad blocks and improve the lifetime of the flash memory.

According to one embodiment, a method of managing bad blocks in a flash memory is provided. The method comprises: detecting states of blocks of a reserved area in the flash memory and building a bad block management table accordingly; recording mappings between bad blocks of an user area in the flash memory and good blocks of the reserved area into the bad block management table; when the bad block management table indicates there is no good block remaining in the reserved area that can be mapped to, selecting one of bad blocks of the reserved area or the user area and obtaining a recollected block after erasing the selected bad block; recording a mapping between the recollected block and a bad block of the user area into the bad block management table; and programming data into the recollected block based on the bad block management table.

According to embodiment, a controller for use in a flash memory is provided. The controller comprises a storage unit and a processing unit. The storage unit is configured to store program codes. The processing unit is configured to execute the program codes. When executing the program codes, the processing unit is configured to perform operations of: detecting states of blocks of a reserved area in the flash memory and building a bad block management table accordingly; recording mappings between bad blocks of an user area in the flash memory and good blocks of the reserved area into the bad block management table; when the bad block management table indicates there is no good block remaining in the reserved area that can be mapped to, selecting one of bad blocks of the reserved area or the user area and obtaining a recollected block after erasing the selected bad block; recording a mapping between the recollected block and a bad block of the user area into the bad block management table; and programming data into the recollected block based on the bad block management table.

According to one embodiment, a method of storing a bad block management table in a flash memory is provided. The method comprises: allocating a restricted area of the flash memory; and searching for good blocks in the restricted area according to a required block number, until the bad block management table can be simultaneously stored on the required block number of good block, wherein a number of blocks of the restricted area is greater than the required block number.

According to one embodiment, a controller for use in a flash memory is provided. The controller comprises: a storage unit and a processing unit. The storage unit is configured to store program codes. The processing unit is configured to execute the program codes. When executing the program codes, the processing unit is configured to perform operations of: allocating a restricted area of the flash memory; and searching for good blocks in the restricted area according to a required block number, until the bad block management table can be simultaneously stored on the required block number of good block, wherein a number of blocks of the restricted area is greater than the required block number.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
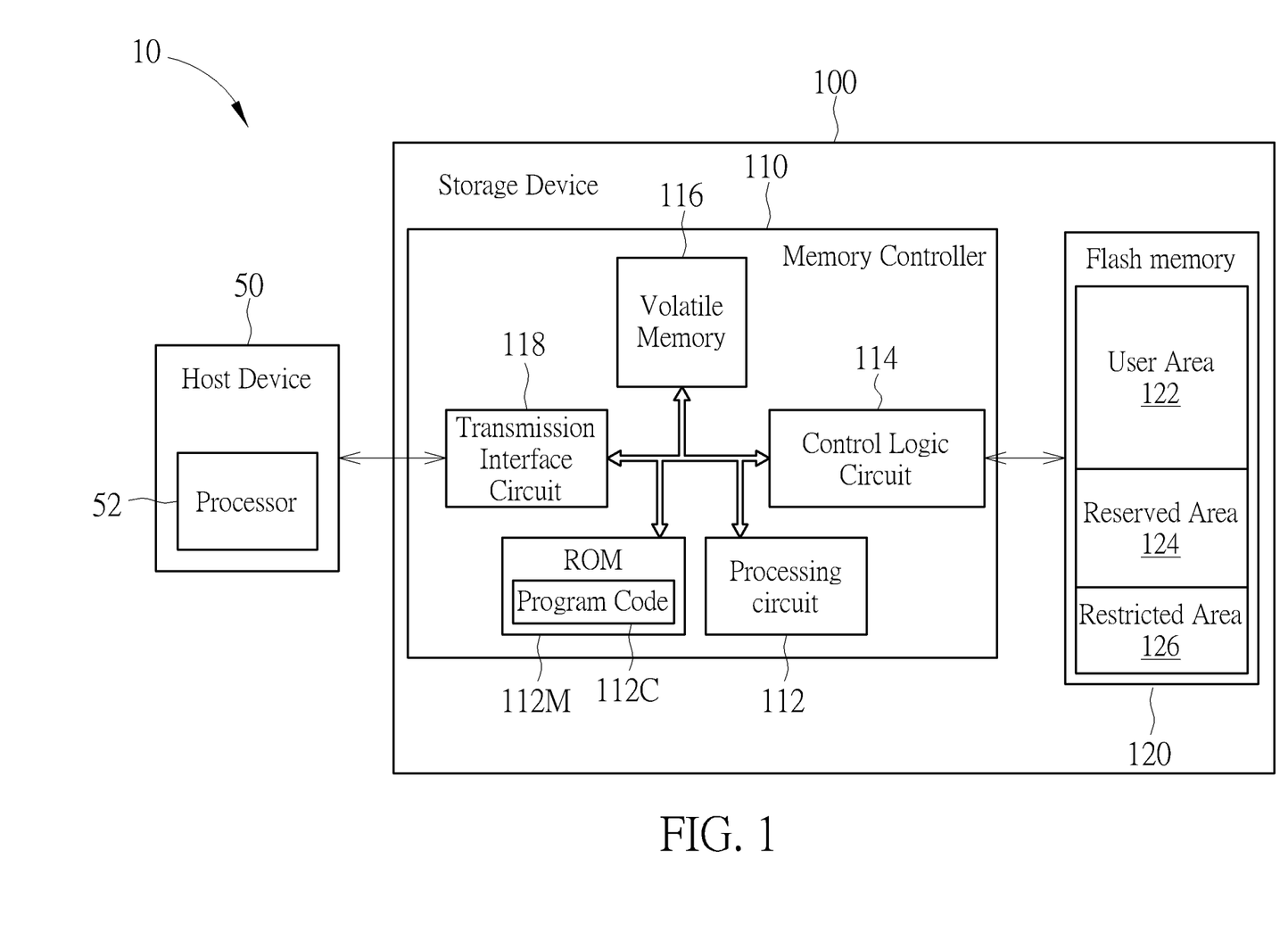
FIG. 1 illustrates a schematic diagram of a storage device and related applications according to one embodiment of the present invention.

FIG. 1 illustrates a schematic diagram of a storage device and related application according to an embodiment of the present invention. As illustrated, a storage device 100 can be used in an electronic device 10, where the electronic device 10 comprises a host device 50. The host device 50 may comprise: at least one processor 52 (one or more processing units) that is arranged to control operations of the host device 50. The storage device 100 of the present invention can provide storage space to the host device 50. Examples of the host device 50 may include (but are not limited to): a smartphone, a tablet computer, a wearable device, a desktop computer, a laptop computer, a digital still camera, a camcorder, a game console, a car navigation system, a printer, or a server system. Examples of the storage device 100 may include (but are not limited to): a portable storage device (such as a memory card compliant with SD/MMC, CF, MS, XD or UFS specifications), a solid state drive and various embedded storage devices (such as an embedded storage device compliant with UFS or EMMC specifications).

According to various embodiments, the storage device 100 may comprise a memory controller 110 a flash memory 120. The memory controller 110 is operable to access the flash memory 120. The flash memory 120 is operable to store information provided by the host device 50 or generated by the memory controller 110. In one embodiment, the flash memory 120 could be NAND flash memory. As shown in FIG. 1, the memory controller 110 may comprise a processing circuit 112, a storage component such as a read-only memory (ROM) 112M, a control logic circuit 114, a volatile memory 116 and a transmission interface circuit 118, where at least one portion of these components may be coupled to one another through a bus. The volatile memory 116 can be implemented by a random access memory (RAM) and configured to provide internal storage space to the memory controller 110, thereby temporarily storing information required by operating the memory controller 110. In addition, the ROM 112M is configured to store a program code 112C, and the processing circuit 112 is configured to execute the program code 112C to control access of the flash memory 120. Alternatively, the program code 112C may be stored in the NV memory 120. The control logic circuit 114 is configured to perform specific controls over the flash memory 120 based on commands or instruction from the processing circuit 112. The transmission interface circuit 118 may conform to a specific communications specification (such as Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification) and may perform communications with the host device 50 according to the specific communications specification.

Typically, the host device 50 may access the memory device 100, indirectly, through transmitting host commands and corresponding logic addresses to the memory controller 110. The memory controller 110 receives the host commands and the logic addresses, and translates the host commands to memory operation commands, and further controls the flash memory 120 with the memory operation commands to perform read, write or erase operations upon memory units or data pages having physical addresses within the flash memory 120. When the memory controller 110 erases the flash memory 120, the erase operation is performed in units of blocks. Generally, a block may contain 16, 32, or 64 pages, and each page contains 512 or 2048 bytes of storage units.

In the present invention, the memory controller 110 allocates storage space of the flash memory 120 as three areas: user area 122, reserved area 124, and restricted area 126, each of which consists of a certain number of blocks. Data to be written requested by the host 50 will be stored on blocks of the user area 122 based on translations from logical addresses to the physical addresses. During the operation of the flash memory 120, once a block of user area 122 becomes a bad block, blocks of the reserved area 124 will be used for replace the bad one. The restricted area 126 is used to store some management tables for the memory controller 110 to access the flash memory 120.

Figure 2:
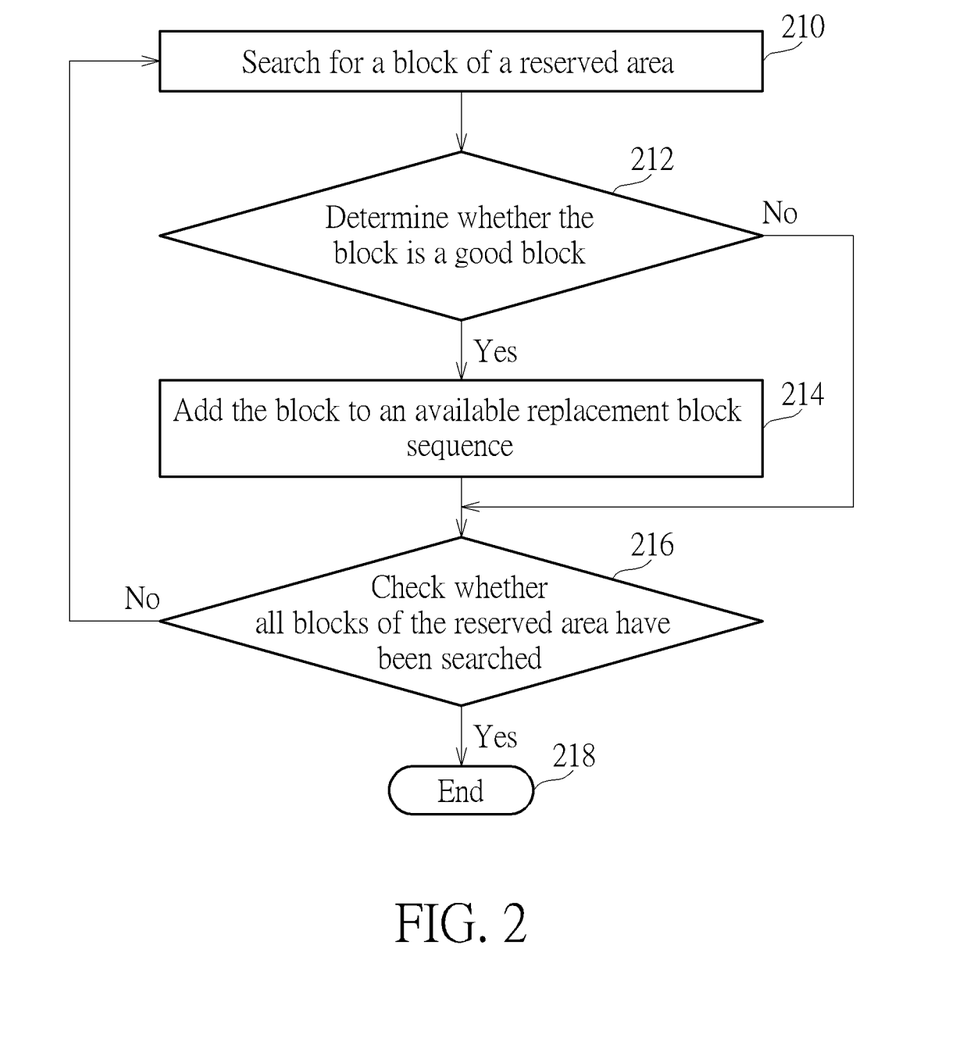
FIG. 2 illustrates a process of building an available replacement block sequence of a bad block management table according to one embodiment of the present invention.

There are two types of bad blocks in the flash memory 120. The first type of bad blocks is invalid block which is marked at the factory. The second type of bad blocks is introduced during operation. When the storage device 100 runs for the first time, the memory controller 110 scans all the blocks to determine whether a state of each block is good or bad. For the invalid blocks of the user area 122, the memory controller 110 builds an invalid block table (IBT) to record and manage. The bad block management table BBT records good blocks of the reserved area 124. When the memory controller 110 finds a bad block of the user area 122 during operation, it will use a good block of the reserved area 124 to replace it. FIG. 2 illustrates a process of building a bad block management table BBT. First, in step 210, the process searches for a block of the reserved area 124. In step 212, it is determined whether the block is a good block. If yes, the flow goes to step 214, adding the block to an available replacement block sequence; if not, the flow goes to step 216 to check whether all blocks of the reserved area 124 have been searched. If the check result of step 216 is yes, the flow will be ended; if not, the flow returns to step 210, thereby to continue searching for a next block from the reserved area 124. Through the above process, good blocks of the reserved area 124 will be recorded into the bad block management table BBT, in order to replace the bad blocks of the user area 122 when necessary.

Figure 3:
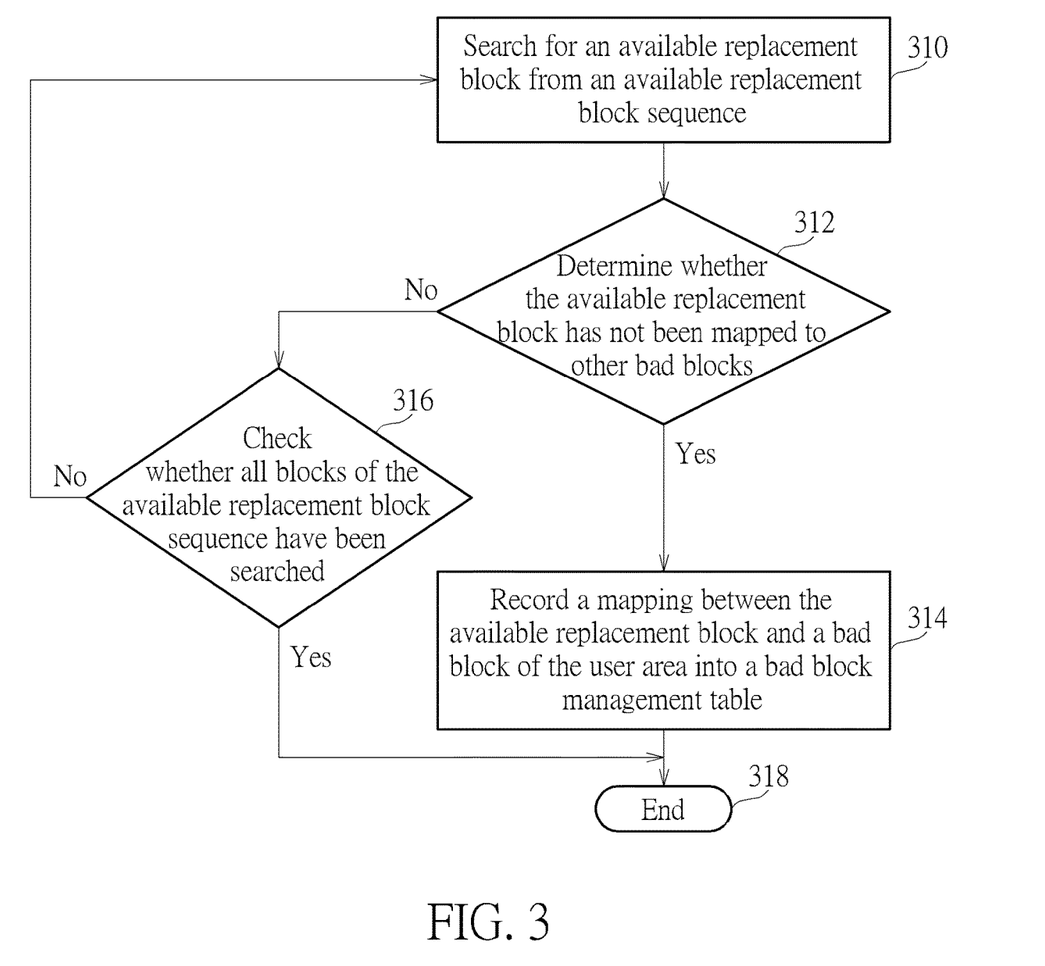
FIG. 3 illustrates a process of recording mappings of a bad block management table according to one embodiment of the present invention.

When the memory controller 110 detects a bad block of the user area 122, it will search for an available replacement block from the available replacement block sequence of the bad block management table BBT. After the available replacement block is found, a mapping between the bad lock (i.e., the block to be replaced) of the user area 122 and the good block (i.e., the block for replacement) of the reserved area 124 is recorded into the bad block management table BBT. A corresponding process is shown in FIG. 3. In step 310, the process searches for an available replacement block (i.e., a certain good block of the reserved area 124) from the available replacement block sequence. In step 312, it is determined whether the available replacement block has not been mapped to other bad blocks. In other words, it is checked whether the available replacement block has not been used to replace the bad blocks of the user area 122. If yes, the flow proceeds to step 314, recording a mapping between the available replacement block and the bad block of the user area 122 into the bad block management table BBT. Accordingly, the flow is ended. If the flow goes to step 316, it will check whether all blocks in the available replacement block sequence have been searched. If the check result of step 316 is yes, it means that there is no available replacement block remaining, and the flow will be ended immediately. If not, the flow returns to step 310 to continue searching for a next available replacement block from the available replacement block sequence.

Figure 4:
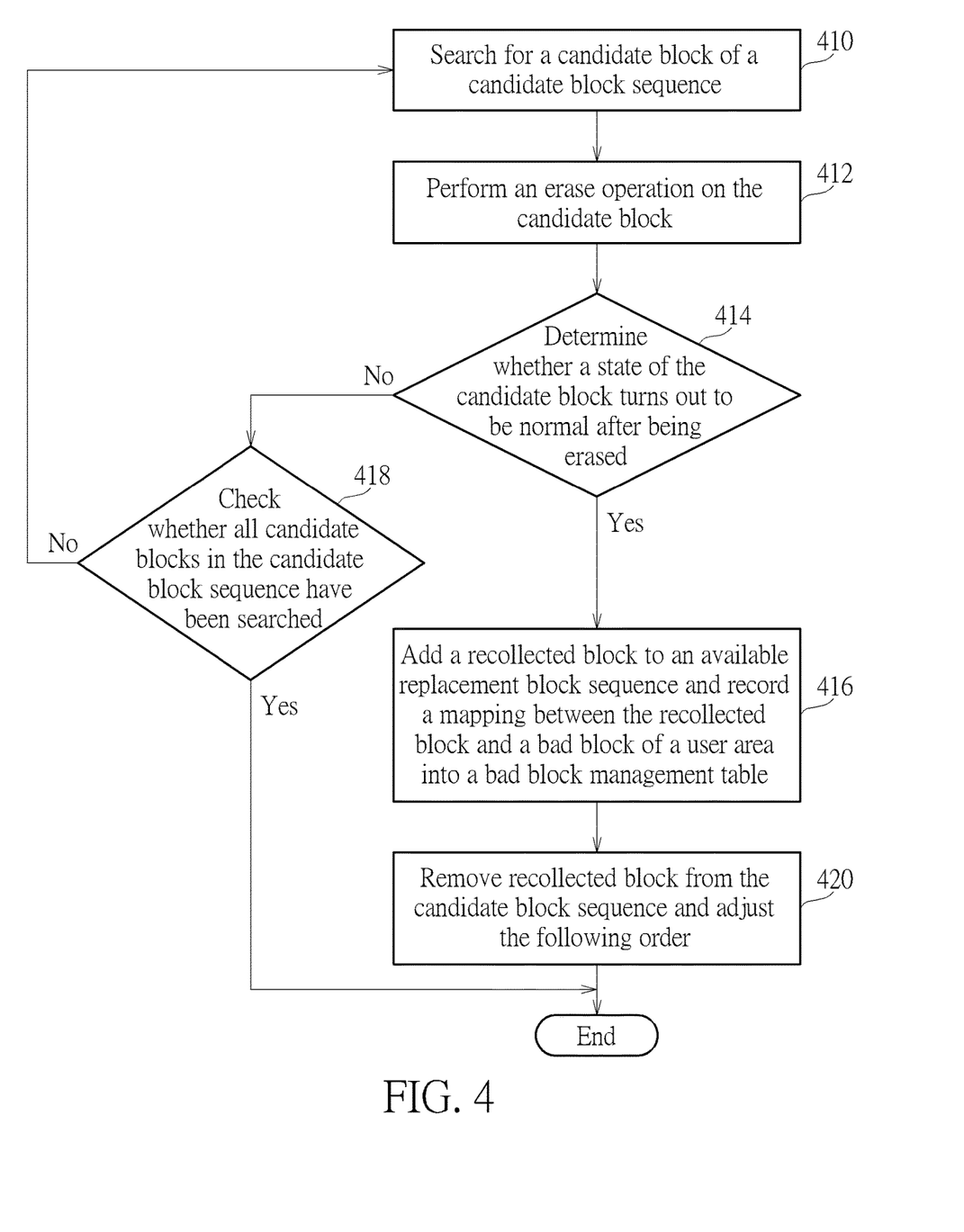
FIG. 4 illustrates a process of recollect pseudo-bad blocks from a reserved area according to one embodiment of the present invention.

As mentioned above, during the process of searching for the available replacement blocks, the memory controller 110 may be aware of there is no available replacement block remaining in the reserved area 124 according to the bad block management table BBT. This satiation is because all available replacement blocks have been mapped to the bad blocks of the user area 122, replacing the bad block to store data. At this time, the memory controller 110 will search for pseudo-bad blocks from the reserved area 124. Specifically, certain bad blocks of the reserved area 124 that are recorded in the bad block management table BBT may be restorable to a normal state after being erased. Such blocks are called "pseudo-bad blocks". Its abnormal state may be caused by unstable or abnormal power supply. In view of this, when there are no available replacement blocks remaining in the reserved area 124, the memory controller 110 will search for candidate blocks from the bad blocks of the reserved area 124 and perform an erase operation on the candidate blocks. Accordingly, it is checked whether the state of the candidate block turns out to be normal after being erased. If the state turns out to be normal, it can be confirmed that the block is pseudo-bad, which can be recollected and added to the available replacement block sequence. Accordingly, the memory controller 110 sets the block as a last entry of the available replacement block sequence of the bad block management table BBT, and builds a mapping between the candidate block and a bad block of the user area 122. On the other hand, since the candidate block has been successfully recollected, it will be removed from a candidate block sequence of the bad block management table BBT. The order in the candidate block sequence will be accordingly adjusted, moving following candidate blocks forward. Such process is illustrated in FIG. 4. In step 410, the process searches for a candidate block of a candidate block sequence of the bad block management table BBT, where the candidate block sequence comprises the bad blocks of the reserved area 124. In one embodiment, the memory controller 110 searches for candidate blocks from those blocks that have been repeatedly mapped to. In the bad block management table BBT, if a bad block of the user area 122 has been mapped to multiple blocks of reserved areas 124, it means that apart of the mappings have become invalid. At this time, the memory controller 110 deems that the blocks of the reserved area 124 whose mapping are invalid are bad blocks, and adds them to the candidate block sequence of the bad block management table BBT.

In step 412, an erase operation is performed on the candidate block. In step 414, it is determined whether the state of the candidate block turns out to be normal after being erased. If yes, it means that the candidate block has been successfully recollected, and the flow proceeds to step 416; if not, it means that the candidate block cannot be recollected, and the flow proceeds to step 418, checking whether all candidate blocks in the candidate block sequence have been searched. If the check result of step 418 is yes, it means that there is no candidate block that can be recollected, and the flow will be ended. If not, the flow returns to step 410, thereby to continue searching for a next candidate block in the candidate block sequence. On the other hand, if the candidate block is successfully recollected, the flow goes to step 416, setting the recollected block as a last entry of the available replacement block sequence, and recording a mapping between the recollected block and a bad block of the user area 122 into the bad block management table BBT. In step 420, the recollected block is removed from the candidate block sequence, and the following candidate blocks are moved forward in order. The flow is accordingly ended.

Figure 5:
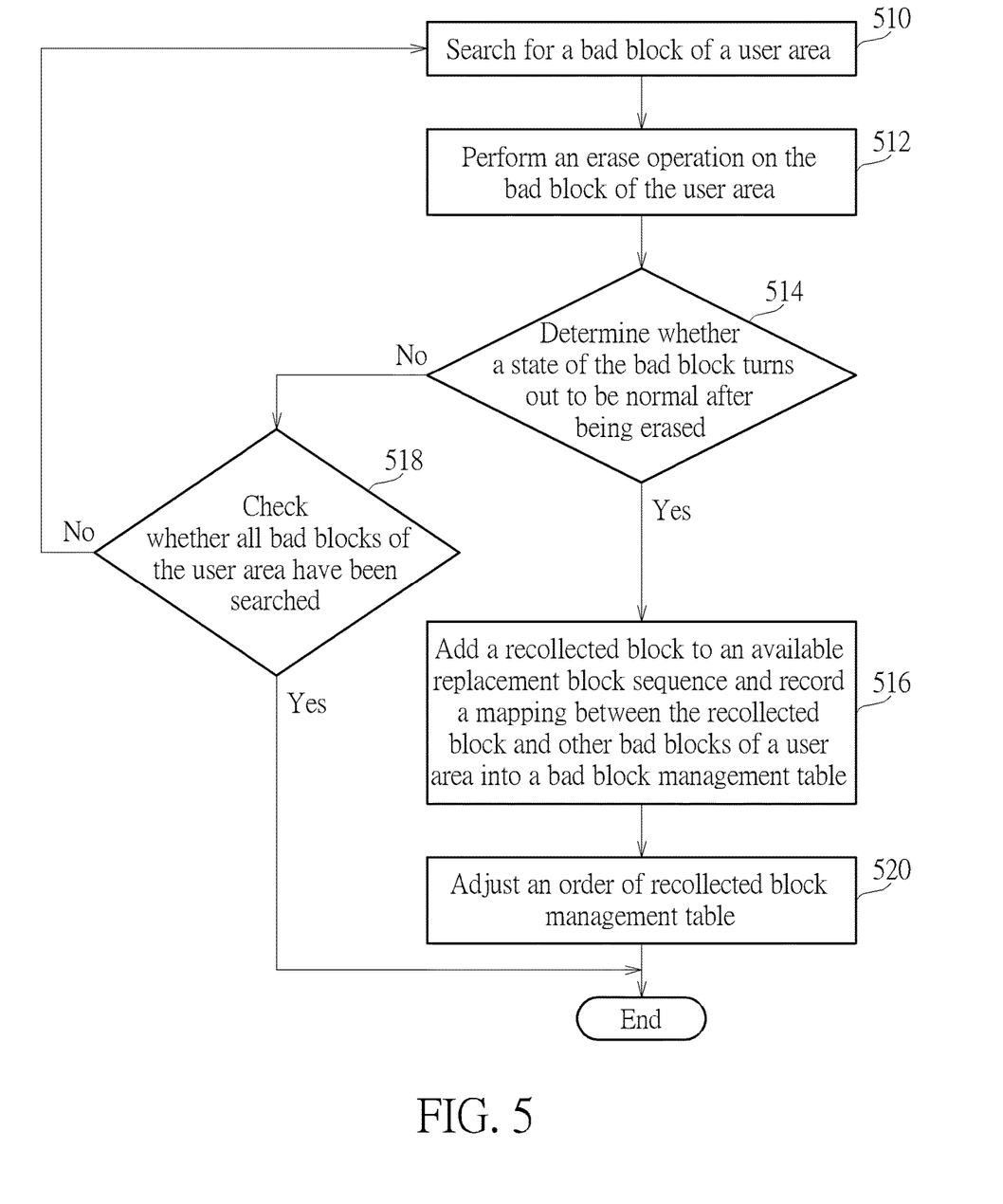
FIG. 5 illustrates a process of recollect pseudo-bad blocks from a user area according to one embodiment of the present invention.

As mentioned above, in addition to failing to find an available replacement block from the bad block management table BBT, the memory controller 110 may also fail to find a pseudo-bad block from the reserved area 124 for recollecting. At this time, the memory controller 110 will further search for pseudo-bad blocks from the user area 122. Specifically, the memory controller 110 sequentially searches the bad blocks of the user area 122 according to the bad block management table BBT, and tries to erase them. If a state of a bad block turns out to be normal after being erased, this block is a pseudo-bad block and thus can be recollected as a replacement block. Accordingly, the memory controller 110 further builds a recollected block management table RBT, which records the pseudo-bad blocks that are successfully recollected from the user area 122. Such process is illustrated in FIG. 5. In step 510, the process searches for a bad block of the user area 122 that has been recorded in the bad block management table BBT. Please note that when the memory controller 110 searches for a bad block of the user area 122, it must be confirmed that the bad block does not exist in the recollected block management table RBT before it is regarded as a candidate block. In this way, repeatedly recollecting same pseudo-bad blocks of the user area 122 can be avoided. In step 512, the bad block is erased. In step 514, it is determined whether a state of the bad block turns out to be normal after being erased. If yes, it means recollection of the bad block of the user area 122 is successful, and the flow proceeds to step 516; if not, it means that recollection fails, and the flow proceeds to step 518 to check whether all the bad blocks of the user area 122 have been searched. If the check result of step 518 is yes, it means that there is no bad block in the user area 122 that can be recovered, and the flow is ended. Otherwise, the flow returns to step 510 to continue searching for a next bad block of the user area 122. On the other hand, if the bad block of the user area 122 is successfully recollected, step 516 is entered, where the recollected block is added as a first entry into the recovery block management table RBT, a mapping between and the recollected block and other bad blocks of the user area 122 are created. In step 520, the following recollected blocks in the reclaimed block management table RBT is shifted back in order, and then the flow is ended.

Figure 6:
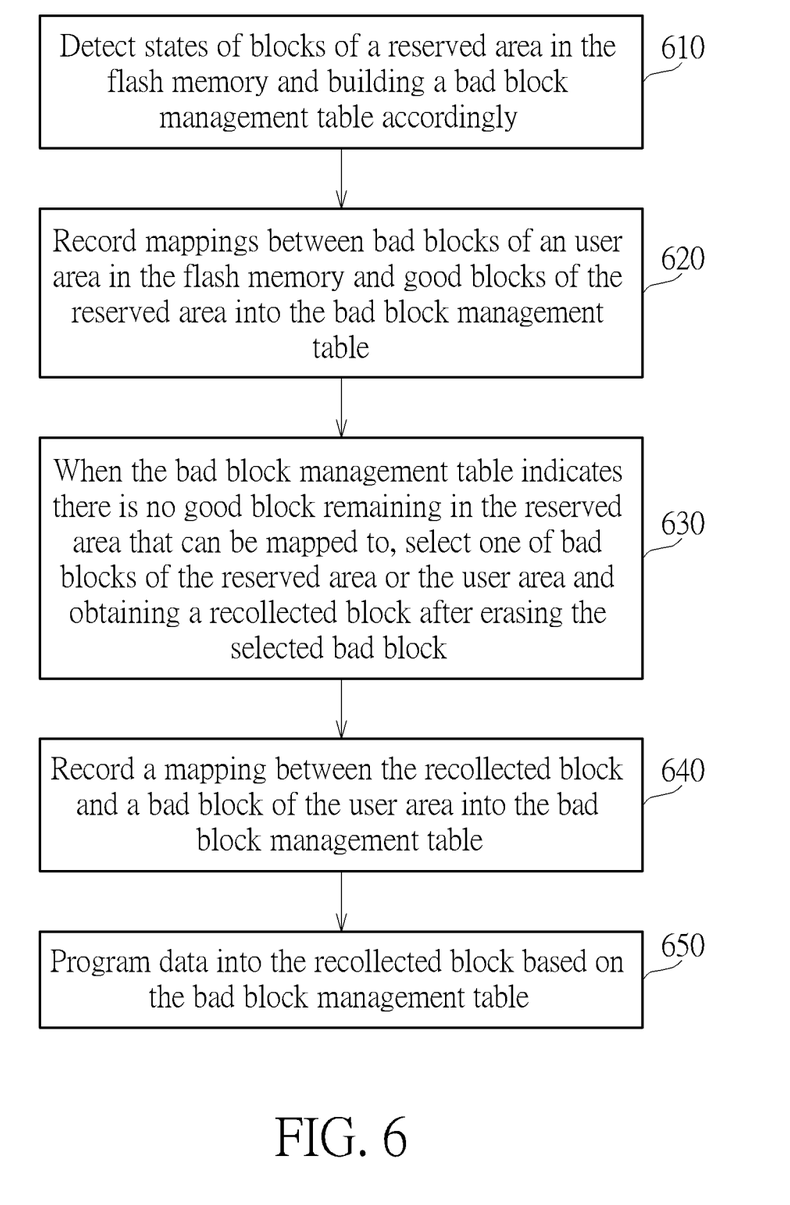
FIG. 6 illustrates a simplified flow of managing bad blocks according to one embodiment of the present invention.

FIG. 6 illustrates a simplified flow of a method for controlling a flash memory based on a bad block management table based on the above embodiments, which comprises:

Step 610: detecting states of blocks of a reserved area in the flash memory and building a bad block management table accordingly;

Step 620: recording mappings between bad blocks of an user area in the flash memory and good blocks of the reserved area into the bad block management table;

Step 630: when the bad block management table indicates there is no good block remaining in the reserved area that can be mapped to, selecting one of bad blocks of the reserved area or the user area and obtaining a recollected block after erasing the selected bad block;

Step 640: recording a mapping between the recollected block and a bad block of the user area into the bad block management table; and Step 650: programming data into the recollected block based on the bad block management table.

As principle and operation details of the above steps have been clearly explained in the previous embodiments, further description will be omitted here. Please note that in other embodiments of the present invention, certain extra steps based on known techniques in the field can be added, so as to improve an overall effect of the present invention.

Since the bad block management table BBT records mappings of the bad blocks of the user area 122, it ensures that the storage device 100 is still able to operate normally even if some blocks fail. Therefore, the reliability of the bad block management table BBT is very important in the storage device 100. In order to ensure the storage security of the bad block management table BBT, one embodiment of the present invention provides a method for storing the bad block management table BBT. In the embodiment, the memory controller 110 allocates a restricted area 126 of the flash memory 120, and searches for blocks required by storing the bad block management table BBT. For example, the memory controller 110 may need two blocks to store and backup the bad block management table BBT simultaneously. Thus, the restricted area 126 will comprise more than two blocks. In this way, when a block that is originally used to store or backup the bad block management table BBT becomes bad, the memory controller 110 will search for a good block from the restricted area 126 to replace the bad block, read the bad block management table BBT stored on the good block, and write it to a new good block. Therefore, the bad block management table BBT can always be stored on two or more blocks at the same time. Since the method of the present invention uses a certain range of blocks to store and backup the bad block management table BBT, instead of storing and backing up the bad block management table BBT on specific fixed blocks, it can improve the storage safety and efficiency of the bad block management table BBT. Please note that the number of blocks mentioned above is for illustrative purposes only and is not a limitation of the present invention. According to various embodiments of the present invention, the bad block management table BBT may be stored on more blocks at the same time, so as to improve storage safety.

In summary, the present invention provides a bad block management mechanism for a flash memory, which can recollect pseudo-bad blocks of a reserved area or an user area when good blocks of the reserved area are not sufficient, thereby extending a lifetime of the flash memory. On the other hand, the present invention also provides a method of storing the bad block management table, which uses a wider range of blocks to store and backup the bad block management table, thereby improving reliability and efficiency of the storing the bad block management table. Thus, the present invention provides safer and more efficient management on the flash memory.

Embodiments in accordance with the present invention can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing bad blocks in a flash memory, comprising:
    detecting states of blocks of a reserved area in the flash memory and building a bad block management table accordingly;
    recording mappings between bad blocks of a user area in the flash memory and good blocks of the reserved area into the bad block management table;
    in response to the bad block management table indicating there is no good block remaining in the reserved area that can be mapped to, selecting one of bad blocks of the reserved area or the user area and obtaining a recollected block after erasing the selected bad block, comprising:
- selecting a first bad block from the bad blocks of the reserved area and erasing the first bad block;
- determining whether a state of the first bad block turns out to be normal after being erased; and
- selecting a second bad block from the bad blocks of the user area and erasing the second bad block only in response to states of all the bad block of the reserved area remaining abnormal after being erased;
- determining whether a state of the second bad block turns out to be normal after being erased; and
- in response to the state of the first block or the second bad block turning out to be normal after being erased, setting the erased first bad block or the erased second bad block as the recollected block;
- adding the erased first block to an available replacement block sequence of the bad block management table as an entry in response to the state of the erased first bad block being the recollected block; and
- adding the erased second block to a recollected block management table as an entry in response to the state of the erased second bad block being the recollected block;
- recording a mapping between the recollected block and a bad block of the user area into the bad block management table; and
- programming data into the recollected block based on the bad block management table.

2. The method of claim 1, further comprising:
- in response to the state of the first bad block remaining abnormal after being erased, selecting a third bad block from the bad blocks of the reserved area and erasing the third bad block;
- and in response to a state of the third bad block turning out to be normal after being erased, setting the erased third bad block as the recollected block.

3. A controller for use in a flash memory, comprising:
- a non-transitory storage unit configured to store program codes; and
- a processing unit configured to execute the program codes, where in response to executing the program codes, the processing unit is configured to perform operations of: detecting states of blocks of a reserved area in the flash memory and building a bad block management table accordingly;
- recording mappings between bad blocks of a user area in the flash memory and good blocks of the reserved area into the bad block management table;
- in response to the bad block management table indicating there is no good block remaining in the reserved area that can be mapped to, selecting one of bad blocks of the reserved area or the user area and obtaining a recollected block after erasing the selected bad block, comprising:
  - selecting a first bad block from the bad blocks of the reserved area and erasing the first bad block;
  - determining whether a state of the first bad block turns out to be normal after being erased; and
  - selecting a second bad block from the bad blocks of the user area and erasing the second bad block only in response to states of all the bad block of the reserved area remaining abnormal after being erased determining whether a state of the second bad block turns out to be normal after being erased; and
  - in response to the state of the first block or the second bad block turning out to be normal after being erased, setting the erased first bad block or the erased second bad block as the recollected block, adding the erased first block to an available replacement block sequence of the bad block management table as an entry in response to the state of the erased first bad block being the recollected block; and
  - adding the erased second block to a recollected block management table as an entry in response to the state of the erased second bad block being the recollected block;
  - recording a mapping between the recollected block and a bad block of the user area into the bad block management table; and
  - programming data into the recollected block based on the bad block management table.

4. The controller of claim 3, wherein in response to executing the program codes, the processing unit is configured to perform on the flash memory operations of:
- in response to the state of the first bad block remaining abnormal after being erased, selecting a third bad block from the bad blocks of the reserved area and erasing the third bad block;
- and in response to a state of the third bad block turning out to be normal after being erased, setting the erased third bad block as the recollected block.

\* \* \* \* \*